United States Patent
Kurtz et al.

(10) Patent No.: US 7,526,962 B1
(45) Date of Patent: May 5, 2009

(54) HIGH PRESSURE DELTA P SENSOR

(75) Inventors: Anthony D Kurtz, Saddle River, NJ (US); Richard "Dick" Martin, Ridgewood, NJ (US); Robert Gardner, Westwood, NJ (US); Adam Kane, Morristown, NJ (US)

(73) Assignee: Kulike Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 12/009,557

(22) Filed: Jan. 18, 2008

(51) Int. Cl.
G01L 9/06 (2006.01)

(52) U.S. Cl. .............................. 73/721; 73/716; 73/753; 73/756

(58) Field of Classification Search ........... 73/700–756; 361/283.1–283.4
See application file for complete search history.

(56) References Cited

U.S. PATENT DOCUMENTS

| 6,363,792 | B1 * | 4/2002 | Kurtz et al. | 73/753 |
| 6,530,282 | B1 * | 3/2003 | Kurtz et al. | 73/756 |
| 6,612,179 | B1 | 9/2003 | Kurtz | |
| 6,895,822 | B2 * | 5/2005 | Kurtz et al. | 73/708 |
| 6,935,184 | B2 * | 8/2005 | Kurtz | 73/756 |

* cited by examiner

*Primary Examiner*—Andre J Allen
*Assistant Examiner*—Jermaine Jenkins
(74) *Attorney, Agent, or Firm*—The Plevy Law Firm

(57) ABSTRACT

A high pressure transducer has a metal housing with a main inlet high pressure port at one end and a reference pressure port at the other end. The ports communicate with a central hollow of the housing. Positioned in the hollow and communicating with the main inlet port is a first header welded to the housing and containing a first sensor device. Also positioned in the hollow and communicating with the reference pressure port is a second header also welded to the housing and having a second sensor device. There is another high pressure port on the housing and located between the inlet and reference ports to receive a main inlet high pressure as applied to said main inlet port and when a reference pressure is applied to said reference port. The applied pressures cause the first header weld to experience zero stress due to the application of the same main pressure to both the main inlet port and another pressure port. The second header weld experiences a weld pressure equal to the difference between the main high pressure and the reference pressure.

20 Claims, 2 Drawing Sheets

HIGH PRESSURE DELTA P SENSOR

FIELD OF THE INVENTION

This invention relates to pressure sensors and more particularly to pressure sensors for measuring very high pressures.

BACKGROUND OF THE INVENTION

Pressure sensor designs using welded sensing capsules have been known in the prior art. Such designs have been utilized for many years. Typical designs include a silicon sensing diaphragm in a glassed header, welded to a fitting or port.

In these designs, the circumferential weld around the header can experience high hoop and tensile stresses due to the containment of the high pressure. Differential pressure measuring devices usually include one of two design variations. Both variations include at least one high pressure sensing capsule, with a stress weld. The two half bridge design includes two high pressure sensing capsules, each containing half of a Wheatstone bridge on a silicon sensing die. Each header is ported to the main or reference pressure. In this case, each weld experiences stress due to the high pressure. For a differential pressure measurement, the half bridges are electrically connected, to electrically subtract the high or main pressure from the low or reference pressure, resulting in a voltage proportional to the differential pressure. These techniques are well known. See, for example, U.S. Pat. No. 6,612, 179 issued on Sep. 2, 2003 to A. D. Kurtz and assigned to the assignee herein, namely Kulite Semiconductor Products, Inc. and entitled "Method and Apparatus for the Determination of Absolute Pressure and Differential Pressure Therefrom". This patent describes a combination of absolute and differential pressure sensing devices including a plurality of absolute pressure transducers, each transducer including a plurality of half bridge piezoresistor structures and a device for selectively coupling at least one of the half bridges to another half bridge. In a second prior art configuration, a single pressure sensing capsule is used, with the reference pressure ported to the rear side of the silicon sensing die. This design requires the use of a Wheatstone bridge on a single die. The difference of the main and reference pressure results in only the differential pressure inducing stress in the sensing diaphragm. Again, the differential pressure results in a voltage output. This design requires the reference tube to be connected to the reference pressure inlet, with high stresses in the tube. In any event, in both of the above prior art designs, the weld is typically in tension. The header is designed with a threaded element to reduce the tensile stress on the weld which increases the fatigue life of the weld. While the tensile stress is decreased considerably, the hoop stress (tangential stress) remains high due to the high pressure. In any event, in order to prevent the glass feed throughs or pins from pushing out of the header as a result of the pressure, a tapered glass/hole interface is used. In addition, the radial pressure pushing on the sides of the header further increases resistance to pin push out and failure of the header feed throughs. Thus, it is desired to produce a differential pressure sensor which eliminates the high pressure on the weld and therefore, eliminates the stress on the weld.

SUMMARY OF THE INVENTION

There is described, a high pressure transducer for measuring differential pressure between a main input pressure and a reference pressure. The transducer has a metal housing, said housing having headers with welded seams which experience high stresses in the presence of high pressures. The pressure transducer housing has an internal hollow having a first inlet main pressure port at one end and an inlet reference pressure port at an opposite end. There a first header positioned within said hollow having at least one first sensor device located on said first header with said sensor communicating with said inlet main pressure port, said sensor positioned on said first header to receive only said main pressure, with a welded seam between said first header and said housing. There is also a second header positioned in said hollow having at least one second sensor device located on said second header with said sensor communicating with said inlet reference port, said sensor positioned on said second header to receive said reference pressure, said housing having a second main high pressure port located between said ends and communicating with said hollow whereby when a high pressure is applied to said second high pressure port, said high pressure impinges on said second sensor to cause second sensor to provide at an output a pressure value relatively equal to the reference pressure, while said first sensor provides at its output a pressure value mainly equal to the pressure applied to said first inlet main pressure port, wherein the weld of said housing positioned between said housing and first header are subjected to an equal pressure on both sides, namely, the main inlet pressure subtracted from the high pressure (equal to the main inlet pressure) and whereby the weld associated with the second header is only subjected to the difference between the main pressure and the reference pressure. The difference or delta pressure is derived by subtracting the main pressure from the reference pressure by combining a half bridge from each sensor to provide a differential pressure output.

A method of reducing weld stress in a circumferential weld formed in a high pressure transducer metal housing, such housing having an inlet high pressure port at one end and an inlet reference pressure port at the other end, each port communicating with an internal hollow of said housing, which comprises the steps of placing a first sensor device in said hollow and communicating with only said inlet high pressure port, placing a second sensor device in such hollow and communicating with said reference pressure port, forming another high pressure port in said housing and communicating with said hollow, applying a high pressure level to said inlet high pressure port and said another high pressure port to cause said circumferential weld to be subject to an equal high pressure on both sides of said weld thereby producing no stress on said weld, applying a reference pressure to said reference pressure port to cause said second sensor to be subjected to a pressure equal to said reference pressure, coupling said first sensor device to said second sensor device to form a full bridge providing an output relatively equal to the difference between said main pressure and said reference pressure.

BRIEF DESCRIPTION OF THE DRAWINGS

Referring to FIG. 1, there is shown a typical prior art differential pressure transducer. The pressure transducer includes a housing 18. In the housing there are a main pressure header 10 and a reference pressure header 14. Both pressure headers contain piezoresistor sensors which are accommodated on silicon diaphragms. In any event, two sensors are wired in a full bridge arrangement. As one can ascertain, there is a main pressure port 16 to which a main pressure is applied and a reference pressure port 15 which a reference pressure is applied. The output of the device is proportional to the difference between the main pressure and the reference pressure as above indicated. In any event, as shown in FIG. 1, each of the headers are welded to the housing and, for example, the circumferential weld 12 is always in tension due to the application of the high pressure thereto. The device of FIG. 1 contains the two high pressure sensing capsules 10 and 14. There is a stress weld 12 which is shown. The weld 12 is a circumferential weld welding the headers as 10 and 14 to the transducer housing 18. The two half bridge design includes the two high pressure sensing capsules 10 and 14 each containing a half of a Wheatstone bridge on the silicon sensing die. Each header is ported to the respective pressure port. Header 10 is ported to the main pressure port 16 and header 14 is ported to the reference pressure port 15. In this case, the weld such as 12, experiences stress due to the high pressures. The half bridges on each of these sensors are electrically connected to electrically subtract the high pressure from the low pressure resulting in a voltage proportional to the difference in pressure.

Referring now to FIG. 2, there is shown a prior art pressure transducer which employs a reference tube and is a differential pressure design as indicated above. As seen, the pressure sensor or transducer is contained in a metal housing 20. There is a header 23 in the housing which header contains a single die or a semiconductor sensor 22 which basically is a full Wheatstone bridge. As seen, there is a lock nut which couples the reference tube 21 to one side of the sensor 22. The other side of the sensor is exposed to a main pressure port 28. The reference tube couples the reference pressure at port 27 to the other side of the sensor die to cause the Wheatstone bridge to produce an output which is the difference between the reference port pressure and the main port pressure. Therefore, as shown in FIG. 2, a single pressure sensor sensing capsule is used, namely, capsule 23. The reference pressure 27 is ported to the rear side of the silicon sensing die. In this prior art design, a full Wheatstone bridge on a single die is used. The difference of the main and reference pressure results in only the differential pressure inducing stress in the sensing diaphragm. This design, as indicated above, requires the reference tube 21 to be connected to the reference pressure inlet 27 with high stresses in the tube. In both the designs of FIGS. 1 and 2, the circumferential weld between the header and housing is typically in tension. Each header is designed with a threaded element to reduce the tensile stress on the weld, which increases the fatigue life of the weld. As indicated above, while the tensile stress is decreased, the hoop stress remains high due to the high pressure. Also as indicated, the glass feeds and pins can push out of header as a result of the high pressure and therefore a tapered glass/hole interface is required.

Referring to FIG. 3, there is shown a high pressure, low stress differential transducer according to the present invention. As one will ascertain in the disclosed design for a differential pressure sensor shown in FIG. 3, the high pressure is admitted or ported to the weld side of both headers. In this design, the half bridge design approach is used. The main pressure header 60 is exposed to the high pressure on both sides of the weld 71A resulting in equal pressures on both sides. With the pressure equal, there is no stress on the weld 71A. Further, there is no pressure on the feed through pins or the glass 36 as the pressure is equal on both sides of the feed throughs. Therefore a straight glass bead hole design can be used in the header shell. The internal cavity 63 behind the sensing die 37 (between the die and glass substrate) is set at atmospheric pressure, the die 37 will measure the high absolute pressure, even though the entire header is surrounded by the high pressure. Thus again referring to FIG. 3, there is shown a high pressure, low stress differential transducer according to this invention. The main pressure inlet port 38 communicates with one surface of the sensor die 37. The reference pressure port is designated as 39. The main sensing pressure die 37 is associated with the main inlet pressure port 38. Thus, the main pressure port 38 and the main pressure inlet 31 both receive high pressure. Therefore, the sensing die 37 receives high pressure at both ends, as the high pressure is also applied to port 31. The pin 36 which is basically a feed through and also is coupled to the header by a glass bond and sees equal pressure on both sides. The reference sensor die 34 is positioned in header 61. Thus, as one can see from FIG. 3, there are two sensing dies, namely, one die 37 for the main pressure and another sensing die 34 for the reference pressure. As will be explained, one utilizes a half bridge configuration from the main pressure sensing die, and a half bridge configuration from the reference pressure sensing die. The two half bridges are connected together to provide a full bridge which produces an output which is proportional to the differential pressure. Thus, the high pressure is admitted to the weld side of both headers via port 31. Thus, both sides of headers 60 and 61 receive the main pressure or high pressure at one side which is the weld side. The main pressure header 60 is exposed to the high pressure also on both sides of the weld. Thus, the pressure header 60 receives the main pressure via port 38 and the main pressure via port 31. Therefore, there is equal pressure on both sides of the main header 60. With equal pressure there is no stress on the weld 71A. Further, there is no pressure on the feed through pins or the bonding glass 36. As the pressure is equal on both sides of the feed throughs, a simple straight hole design can be used in the header shell and that is aperture 36. The entire cavity behind the sensing die 37, that is the cavity between the die and the glass substrate is set at atmospheric pressure with a metal sleeve in cavity 63. The die 37 will measure the absolute pressure even though the entire header is surrounded by the high pressure. As one can understand, the high main pressure is received through aperture 31 which is also applied to the reference header 61 on one side. The other side of header 61 receives the reference pressure from port 39. Thus, the reference header 61 which contains a second half bridge responds to the reference pressure via port 39. The rear of the header 61 is also exposed to the main high pressure via port 31 which is blocked from the die 34 by insert 68. The weld 70 will only experience the differential pressure, rather than the much higher absolute pressure. The header design can therefore be simplified with straight pins as the pressure is much lower on the glass. As the higher pressure is on the exterior of the weld, the weld is in compression with much lower stress rather than tension. The weld hoop stress is also much lower and the weld experiences only the differential pressure. With much lower stress, the weld penetration can be smaller, resulting in a smaller header design. With a smaller weld penetration, the distance between the glass feed throughs and the weld can be smaller, again, resulting in smaller diameter headers. Again, as the rear 63 of the sensing die (between the die and glass) is at atmospheric pressure the header 60 will sense the absolute reference pressure correctly. The electrical subtraction of the two half bridges from die 37 and die 34 is accommodated. One sensor is at main high pressure and the other a lower reference pressure, the output results in a differential pressure measurement. As an example, the unit depicted in FIG. 3 may be designed for an absolute pressure of 30,000 psi, and a differential pressure of 3,000 psi. The main header will be subjected to 30,000 psi on both sides of the weld 71. This is through ports 31 and 38. The weld 71 will have no stress and one can use a low weld penetration. The reference side header 61 is exposed to 30,000 psi on the exterior of the weld and the reference pressure of 27,000 psi on the interior of the weld. This will result in a differential pressure measurement of 3,000 psi. The reference header weld will experience a pressure of 3,000 psi, well below the main pressure of 30,000 psi and below the reference pressure of 27,000 psi. For pressure q applied to the external wall of the cylinder, the stress at a radius r is calculated as follows:

Radial stress (1) $\gamma r = qa^2 \ (r^2-b^2)/r^2(q^2-b^2)$ maximum at external radius a Tangential Stress (2) $\gamma t = qa^2(b^2+r^2)/r^2(a^2-b^2)$ maximum at internal radius b where $\gamma r$=radial stress $\gamma t$=tangential stress $\gamma z$=axial stress=$-qa^2/(a^2-b^2)$ q=pressure r=radius of header These are Roark's Formulas for stress and strain, by W. C. Young, McGraw-Hill (1989), p. 639.

For a header 0.375 inches in diameter with a 0.015 weld penetration, the stresses, for an applied pressure will be:

$\gamma r$=13 q (max. at external diameter a)

$\gamma t$=$-q$ (max. at internal diameter b)

$\gamma z$=6.5 q.

Figure 1:
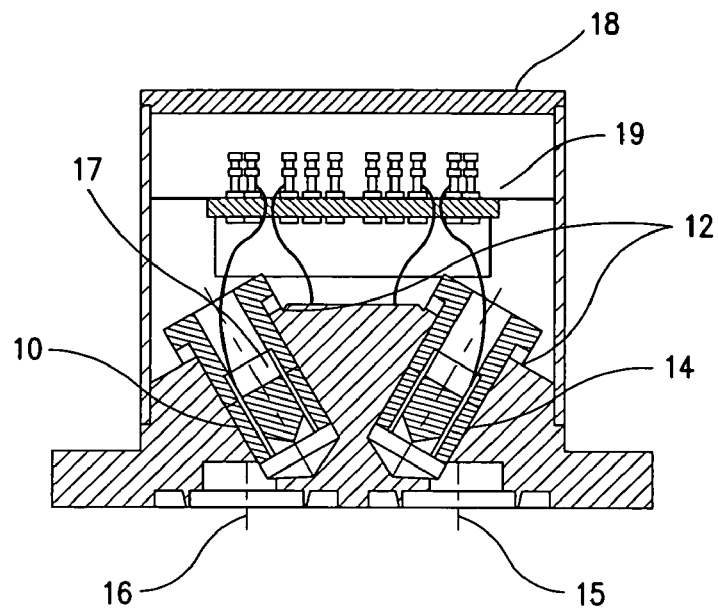
FIG. 1 illustrates a cross-sectional view of a transducer housing having two headers according to the prior art.
Figure 2:
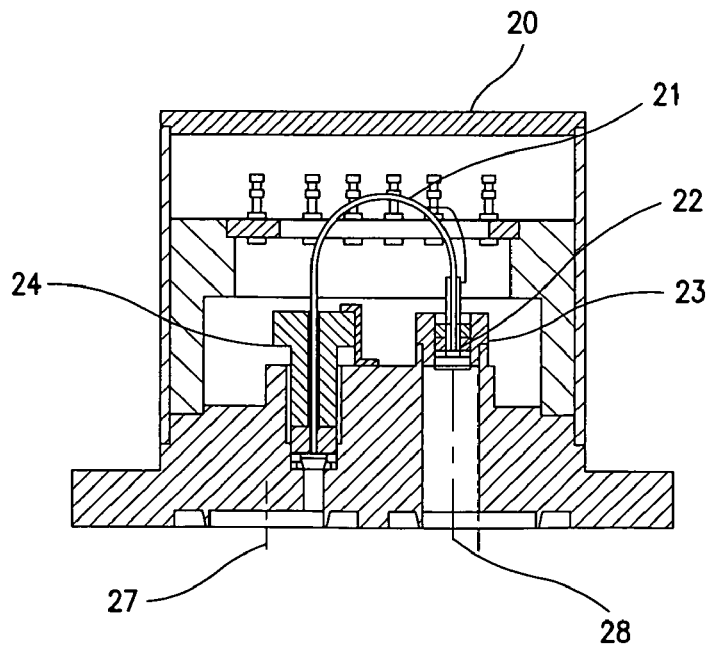
FIG. 2 is a cross-sectional view of a prior art transducer housing having one header.

With the pressure being the differential pressure of 3,000 psi, the hoop stress will be 39,000 psi. In the standard half bridge or reference tube (FIG. 2), this stress will be based on the full pressure of 30,000 psi, resulting in the much higher hoop stress of 390,000 psi requiring a larger header with a larger weld penetration. There are several additional features of the invention of FIG. 3, along with the weld in compression and with a much lower stress. The design shown in FIG. 3 makes use of an oil filled header with an isolation diaphragm. The isolation diaphragm protects the sensing die from the harsh environment of the pressure media. The half bridge design prevents contamination if a sensing die fails since there is no pressure connection between the failed header and the other pressure side. This is especially important in a filter application where the contamination fluids should not reach the clean side of the filter. The safety and reliability are increased as the welds and glass are no longer highly stressed making them less critical processes. Also the dielectric isolation can be increased, as a larger header with a low penetration weld can be used, increasing the available space for larger glass diameters.

Figure 4:
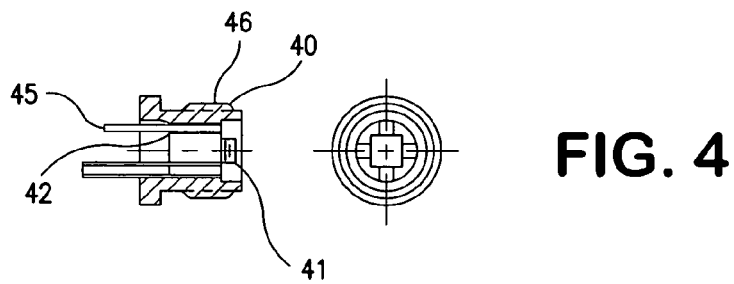
FIG. 4 is a cross-sectional side view of a header according to this invention.

Referring to FIG. 4, there is shown a header with dimensions. As seen the header 40 contains a sensing die 41 and basically has a threaded portion 46. The sensor also contains a glass member or glass layer 42 which surrounds a conductor or pin 41. Typical dimensions for the header are shown in FIG. 4. As one can ascertain, the header is extremely small.

Figure 3:
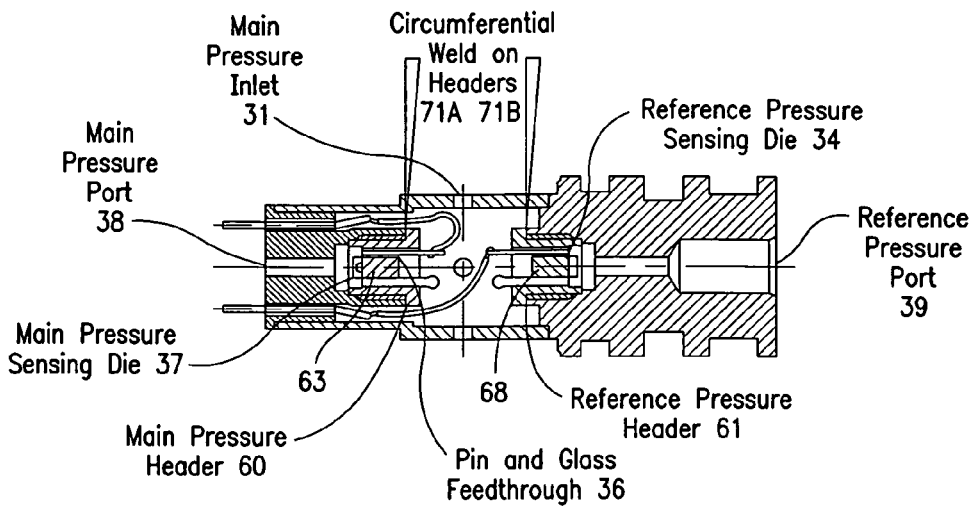
FIG. 3 is a side cross-sectional view of a housing having two headers according to this invention.
Figure 5:
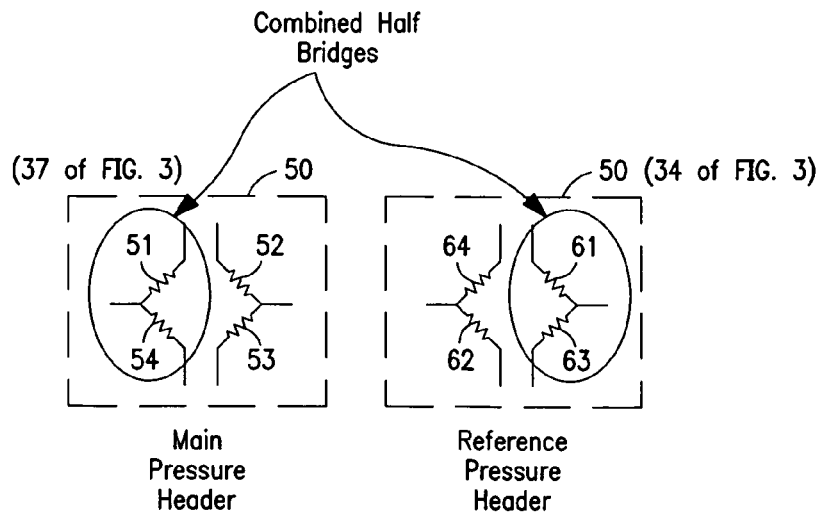
FIG. 5 is an electrical schematic of two half bridges combined to form a full bridge.

Referring to FIG. 5, there is shown a typical sensing die 50 which would be the die 37 shown on the main pressure header 60 as shown in FIG. 3. Also shown is a reference pressure sensing die 51. As one can see, each sensing die contains four piezoresistor devices as, for example, piezoresistors 51, 51, 53 and 54 for the main pressure sensing die 50 which are associated with the main pressure header 60. Thus, the sensing die 37 would have four resistors and would be positioned as shown in header 60. The reference pressure header 61 contains the sensing die 51 (die 34) which also has four resistors 61, 62, 63 and 64. Each resistor is connected together to form a half bridge arrangement. Thus, the half bridge consisting of resistors 51 and 54 would be connected to the half bridge, including resistors 62 and 64 to form a full bridge. In a similar manner, one can connect resistor 52 and 53 to resistors 60 and 63 or vice versa to form a full Wheatstone bridge from the combined half bridge circuits. In this manner, the half bridge design is used as indicated above. There are two separate headers and therefore basically two separate pressure capsules as shown in FIG. 3. This prevents high pressure from being exerted on the weld 70 and 70B of FIG. 3. The two header design has the main pressure ported to both sides of the main pressure header 60 by ports 38 and 31. The main pressure is also ported to one side of the reference pressure header 61 which receives a reference pressure via port 39. To be perfectly clear, as one can see in FIG. 3, the main sensing die 37 receives the high pressure via port 38. The die 37 does not receive the pressure from port 31 as that pressure is blocked from the die by sleeve 63 and therefore the only pressure received by the sensor 37 is the main or high pressure. The internal cavity 63 of the sensing die is set at atmospheric pressure and therefore the sensing die 37 will measure the high absolute pressure even though the entire header is surrounded by the high pressure. Therefore, the weld 71A will only receive the difference between the high pressure at port 38 and the high pressure at port 31, which are basically equal, and therefore the main pressure header weld 71 is exposed to high pressure on both sides. With equal pressure there is no pressure on the weld. The reference die 34 is also blocked from received high pressure by sleeve 68 and, therefore, measures the reference pressure at port 39. However, the output is the differential voltage as the main pressure subtracted from the reference pressure which is provided by the combined half bridges of FIG. 5. It is also understood that the reference port 3a could serve as the main pressure port 38 where the weld 71A would be in compression instead of tension.

As one can see from the above, there is shown a unique design which accommodates high pressure with no stress on the welds. It should be apparent to one skilled in the art that alternate embodiments of such a design may be discerned. The device shown discloses a high pressure, low weld stress differential pressure transducer. One skilled in the art will discern many alternative embodiments all of which are deemed encompassed within the spirit and scope of the claims appended hereto.

What is claimed is:

1. A high pressure transducer for measuring a differential pressure between a main input pressure and a reference pressure, said transducer having a metal housing, said housing having welded seams which undesirably experience high stresses in the presence of high pressures, comprising:

a) a pressure transducer housing having an internal hollow and having a first inlet main pressure port at one end and an inlet reference pressure port at an opposite end;

b) a first header position within hollow having at least one first sensor device located on said header with said sensor communicating with said inlet main pressure port, said sensor positioned on said first header to receive only said main pressure, with a welded seam between said first header and said housing;

c) a second header positioned in said hollow having at least one second sensor device located on said second header with said sensor communicating with said inlet reference port, said sensor positioned on said second header to receive only said reference pressure, said housing having a second main high pressure port located between said ends and communicating with said hollow whereby when a high pressure is applied to said second high pressure port, the weld of said housing as positioned between said housings and said first header is subjected to an equal pressure on both sides, namely, the main inlet pressure subtracted from the pressure applied to said second main high pressure port and whereby the weld associated with the second header is only subjected to the difference between the main pressure and the reference pressure.

2. The pressure transducer according to claim 1, wherein said first sensor device is a half bridge including first and second resistors in series.

3. The pressure transducer according to claim 2, wherein said resistors are piezoresistive resistors.

4. The pressure transducer according to claim 2, where said second sensor device is a half bridge including third and fourth resistors in series.

5. The pressure transducer according to claim 4, wherein said half bridges are connected in a full Wheatstone bridge configuration to provide an output equal to the said main pressure subtracted from said reference pressure.

6. The pressure transducer according to claim 5, wherein each half bridge is associated with a semiconductor die with each die located on said associated header.

7. The pressure transducer according to claim 1, wherein said inlet main pressure is about 30,000 psi, with said reference pressure being about 27,000 psi with said high pressure being relatively equal to said main pressure of 30,000 psi and said difference between said main pressure and said reference pressure is about 3,000 psi.

8. The pressure transducer according to claim 1, wherein each header is approximately 0.375 inches in diameter with a 0.015 inch weld penetration.

9. The method according to claim 1, further including the steps of:
   a) placing conductive pins in said first header to connect with said first sensor device; and
   b) placing conductive pins in said second header to connect with said second sensor device.

10. The method according to claim 9, further including the step of:
   a) connecting said conductive pins of said first header to said conductive pins of said second header to thereby electrically connect said first sensor device to said second sensor device.

11. A method of reducing weld stress in a circumferential weld formed in a high pressure transducer metal housing, such housing having an inlet high pressure port at one end and an inlet reference pressure port at the other end, each port communicating with an internal hollow of said housing, comprising the steps of:
   a) placing a first sensor device in said hollow and communicating with only said inlet high pressure port;
   b) placing a second sensor device in said hollow and communicating with said reference pressure port;
   c) forming another high pressure port in said housing communicating with said hollow;
   d) applying a high pressure level to said inlet high pressure port and said another high pressure port to cause said circumferential weld to be subject to an equal high pressure on both sides of said weld thereby producing no stress on said weld;
   e) applying a reference pressure to said reference pressure port to cause said second sensor to be subjected to a said reference pressure;
   f) coupling said first sensor device to said second sensor device to form a bridge providing an output relatively equal to the difference between said main pressure and said reference pressure.

12. The method according to claim 11, further including the steps of placing said first sensor device in a first header, placing said second sensor device in a second header and welding first and second headers to said housing.

13. The method according to claim 1, wherein said first and second sensor devices are one-half bridge devices, each including at least two sensing resistors in series.

14. The method according to claim 13, wherein said sensing resistors are piezoresistors.

15. The method according to claim 14, including the step of forming said first one-half piezoresistor bridge on a first semiconductor indicative of said first sensor device, and forming said second one-half piezoresistor bridge on a second die indicative of said second sensor.

16. The method according to claim 15, wherein said first and second dies are silicon dies.

17. The method according to claim 13, wherein the step of coupling said first sensor device to said second sensor device includes the step of connecting said half-bridges together to form a full Wheatstone bridge for providing an output proportional to the difference between said main pressure and said reference pressure.

18. The method according to claim 11, wherein the step of forming another high pressure port includes the step of positioning said another port between said inlet pressure port and said reference port.

19. The method according to claim 11, wherein said main inlet pressure is about 30,000 psi, with said reference pressure being about 27,000 psi, with said pressure applied to said another high pressure port is said main pressure of 30,000 psi, with the difference between said main pressure and said reference pressure being 3,000 psi.

20. The method according to claim 11, herein said first and second headers both include a thread/portion to reduce the tenile stress on said weld.

* * * * *

UNITED STATES PATENT AND TRADEMARK OFFICE
CERTIFICATE OF CORRECTION

PATENT NO. : 7,526,962 B1  Page 1 of 1
APPLICATION NO. : 12/009557
DATED : May 5, 2009
INVENTOR(S) : Kurtz et al.

It is certified that error appears in the above-identified patent and that said Letters Patent is hereby corrected as shown below:

Title page, item [73] Assignee, replace "Kulike" with --Kulite--

Signed and Sealed this

Sixteenth Day of June, 2009

JOHN DOLL
*Acting Director of the United States Patent and Trademark Office*